US009459752B2

(12) United States Patent
Wang et al.

(10) Patent No.: US 9,459,752 B2
(45) Date of Patent: Oct. 4, 2016

(54) BROWSING ELECTRONIC MESSAGES DISPLAYED AS TILES

(71) Applicant: MICROSOFT TECHNOLOGY LICENSING, LLC, Redmond, WA (US)

(72) Inventors: Yanling Wang, Belmont, CA (US); Hui Wang, Foster City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 13/715,431

(22) Filed: Dec. 14, 2012

(65) Prior Publication Data
US 2014/0173457 A1 Jun. 19, 2014

(51) Int. Cl.
*G06F 3/0481* (2013.01)
*G06F 3/048* (2013.01)
*G06F 3/0488* (2013.01)
*G06F 3/0482* (2013.01)
*G06Q 10/10* (2012.01)

(52) U.S. Cl.
CPC .............. *G06F 3/048* (2013.01); *G06F 3/0482* (2013.01); *G06F 3/0488* (2013.01); *G06Q 10/107* (2013.01)

(58) Field of Classification Search
CPC .... G06Q 10/10; G06Q 10/107; G06F 3/048; G06F 3/0488; G06F 3/0482
USPC .......................................................... 715/752
See application file for complete search history.

(56) References Cited

U.S. PATENT DOCUMENTS 6,724,403 B1    4/2004  Santoro et al.
7,577,922 B2    8/2009  Mann et al.
(Continued)

FOREIGN PATENT DOCUMENTS

EP    2207346 A1    7/2010

OTHER PUBLICATIONS

International Search Report and Written Opinion for Application No. PCT/US2013/074746 mailed Mar. 24, 2014, 8 pages.
(Continued)

*Primary Examiner* — Anil Bhargava
(74) *Attorney, Agent, or Firm* — Jessica Meyers; Tom Wong; Micky Minhas

(57) ABSTRACT

Electronic messages are displayed as tiles. A tile may include a background related to the electronic message. For example, the background of a tile may be a preview of an attachment to the message. When the message includes an attachment (e.g. document, picture, link . . . ), an overlay is displayed over the background. The overlay includes information relating to the electronic message (i.e. subject, sender, time, message preview . . . ). When the message does not include an attachment then the tile may include all/portion of the content of the electronic message. For example, the tile may include the subject, sender, time stamp, and message content. A user may switch between different browsing experiences (e.g. conversation view, list view, strip view, . . . ). When a tile represents a conversation each sender within the conversation may be displayed on a tile along with a preview of the messages of the conversation (i.e. the most recent message).

20 Claims, 14 Drawing Sheets

(56) References Cited

U.S. PATENT DOCUMENTS

| | | | |
|---|---|---|---|
| 8,150,924 B2* | 4/2012 | Buchheit | G06Q 10/107 709/201 |
| 2005/0198584 A1 | 9/2005 | Matthews et al. | |
| 2005/0268237 A1* | 12/2005 | Crane | G06F 3/0481 715/732 |
| 2007/0082707 A1 | 4/2007 | Flynt et al. | |
| 2009/0307607 A1* | 12/2009 | Schauls | G06F 3/0483 715/752 |
| 2010/0070880 A1 | 3/2010 | Chinta | |
| 2010/0162138 A1 | 6/2010 | Pascal et al. | |
| 2011/0119258 A1* | 5/2011 | Forutanpour | G06Q 10/107 707/723 |
| 2012/0011449 A1* | 1/2012 | Sasson | H04L 51/08 715/752 |
| 2012/0162266 A1 | 6/2012 | Douglas et al. | |
| 2013/0239003 A1* | 9/2013 | Usenko | G06F 3/0488 715/733 |
| 2013/0326362 A1* | 12/2013 | Murray | G06Q 10/10 715/750 |
| 2013/0332850 A1* | 12/2013 | Bovet | G06F 3/0488 715/752 |
| 2014/0082494 A1* | 3/2014 | Harari | H04L 51/22 715/716 |

OTHER PUBLICATIONS

"Concept: Windows Phone 7 Email Hub", Published on: Mar. 2, 2011, Available at: http://wmpoweruser.com/concept-windows-phone-7-email-hub/.

* cited by examiner

BROWSING ELECTRONIC MESSAGES DISPLAYED AS TILES

BACKGROUND

Many people use electronic message programs to create, view and respond to electronic messages. The electronic message programs typically display a large list of messages such that a user can select one of the messages in order to obtain more detail. Today, users can access their electronic messages on desktop computers as well as on their mobile computing devices. As a result, users typically are informed of new messages as they are received and can view these messages in a more timely manner as compared to when the user had to wait to return to their desktop computer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Electronic messages are displayed as tiles. A tile includes a background that includes information obtained from the electronic message. For example, the background of a tile may be a preview of an attachment to the message (e.g. a picture, document, link . . . ). When the message includes an attachment, an overlay is displayed over the background. The overlay includes information relating to the electronic message (i.e. subject, sender, time stamp, message preview . . . ). When the message does not include an attachment then the tile may include all/portion of the content of the electronic message. For example, the tile may include the subject, sender, time, and message content. A user may switch between different browsing experiences to navigate the electronic messages (e.g. conversation view, list view, strip view, . . . ). For example, when a tile represents a conversation each sender within the conversation may be displayed on a tile along with a preview of the messages of the conversation (i.e. the most recent message).

DETAILED DESCRIPTION

Figure 1:
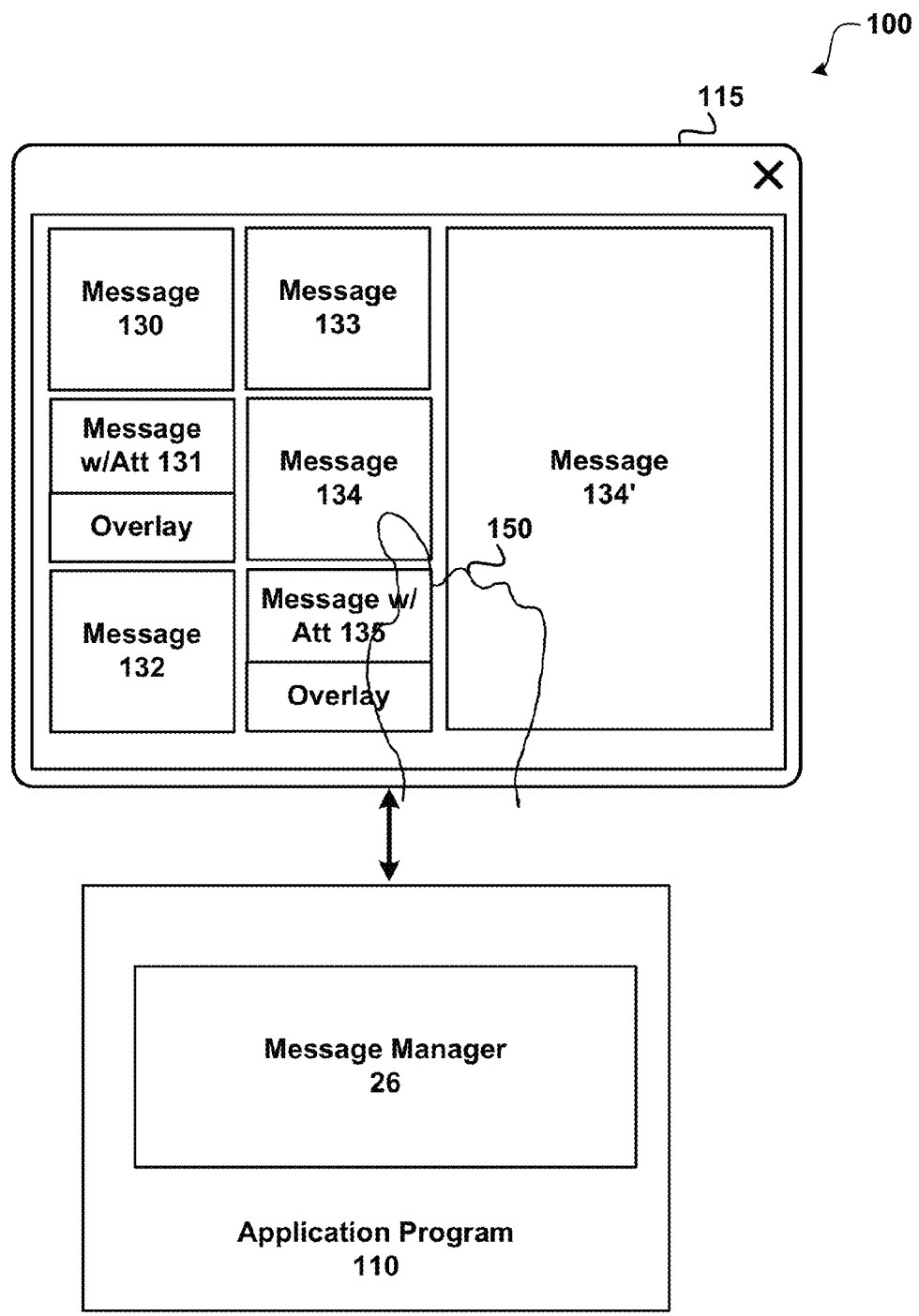
FIG. 1 shows a system for displaying electronic messages as tiles.

Referring now to the drawings, in which like numerals represent like elements, various embodiment will be described.

FIG. 1 shows a system for displaying electronic messages as tiles. As illustrated, system 100 includes application program 110, message manager 26 and touch screen input device/display 115.

In order to facilitate communication with the message manager 26, one or more callback routines, may be implemented. According to one embodiment, application program 110 is a productivity application, such as an electronic messaging program such as MICROSOFT OUTLOOK, that is configured to receive input from a touch-sensitive input device 115 and/or other input devices. For example, voice input, keyboard input (e.g. a physical keyboard and/or SIP), video based input, and the like. For example, message manager 26 may provide information to application 110 in response to a user's gesture (i.e. gesture 150) selecting a user interface element, content and other touch based gestures. For example, gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Message manager 26 is configured to display electronic messages as tiles. Display 115 illustrates a message browsing display that includes six messages (130-135) displayed as tiles and a larger view of a selected message (134'). Generally, tiles include more displayable area for content as compared to the space utilized for displaying an electronic message in a list. Displaying messages as tiles may make it easier for a user to more readily view message content of electronic messages that have not been viewed yet as compared to displaying a large list of electronic messages. A tile may include a background related to the electronic message. For example, the background of a tile may be a preview of an attachment to the message (e.g. a picture, document, link . . . ). When the message includes an attachment (e.g. 131, 135), an overlay is displayed over the background. The overlay includes information relating to the electronic message (i.e. subject, sender, time stamp, message preview . . . ). When the message does not include an attachment then the tile may include all/portion of the content of the electronic message. For example, the tile may include the subject, sender, time, and message content. A user may switch between different browsing experiences to navigate the electronic messages (e.g. list view+message, tile view+message on right, tile view+message on top or bottom, tile views only . . . ). For example, a user may switch back to the transitional list view, have the message showing above or below a strip of tiles, or seeing tiles only. More details are provided below.

Figure 2:
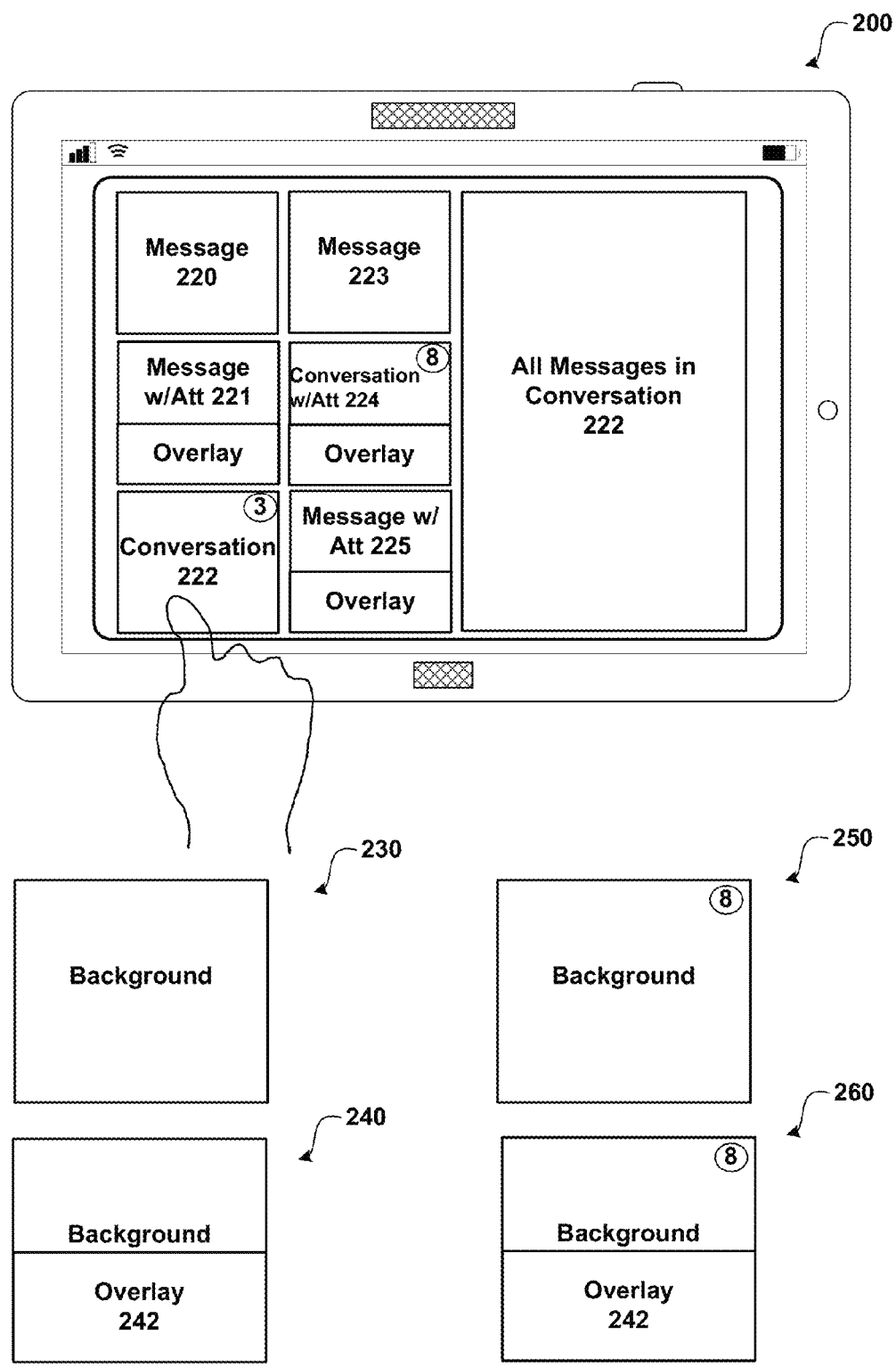
FIG. 2 shows an exemplary display of messages displayed as tiles including a conversation view.

FIG. 2 shows an exemplary display of messages displayed as tiles including a conversation view. As illustrated, FIG. 2 shows display 200, tile 230, tile 240, tile 250 and tile 260.

The tiles may be shown on displays having a standard/large display (e.g. displays larger than 12 inches) as well as a device having a limited display size (e.g. a cell phone having a display of approximately 2 by 3 inches, a slate/tablet having approximately a 7-10 inch display, and/or other devices having other display sizes (e.g. 4, 5, 6). The displays may also be shown on a touch screen.

As illustrated, display 200 includes messages that do not include attachments (message 220 and message 225), messages that include attachments (message 221 and message 225), a group of messages displayed as a conversation view, the latest of which has an attachment (message 224) or not (message 222). In the current example, a user has selected message 222 to obtain a more detailed view (message 225').

According to an embodiment, when a message does not include an attachment, the background 230 of the tile includes a preview of the message along with other message information. For example, the tile includes a subject of the message, a sender(s), a time the message was sent/received along with all/portion of the content of the message.

Tile 240 illustrates a tile that includes an attachment. When the message includes an attachment, the background is an image/preview of the attachments. According to an embodiment, an attachment as used herein includes attachments that are included with the delivery of the message as well as a link to the attachment and/or other content. Overlay 242 includes information relating to the electronic message (i.e. subject, sender, time stamp, message preview . . . ).

Tile 250 illustrates a conversation displayed as tile and the latest email in the conversation does not include an attachment. Tile 250 is the same as Tile 230 except it has a badge showing how many messages are in this conversation. The messages within the conversation are displayed in the message area.

Tile 260 illustrates a conversation displayed as tile and the latest email in the conversation includes an attachment. Tile 260 is the same as Tile 240 except it has a badge showing how many messages are in this conversation. The messages within the conversation are displayed in the message area.

The tile may be a static tile where the content displayed on the tile remains constant and/or a dynamic tile where all/portion of the content is animated on the tile. For example, a message may be scrolled within the display of the tile and/or any attachments may be cycled through on the tile (e.g. display an attachment for one period of time and a second attachment for another period of time).

Figure 3:
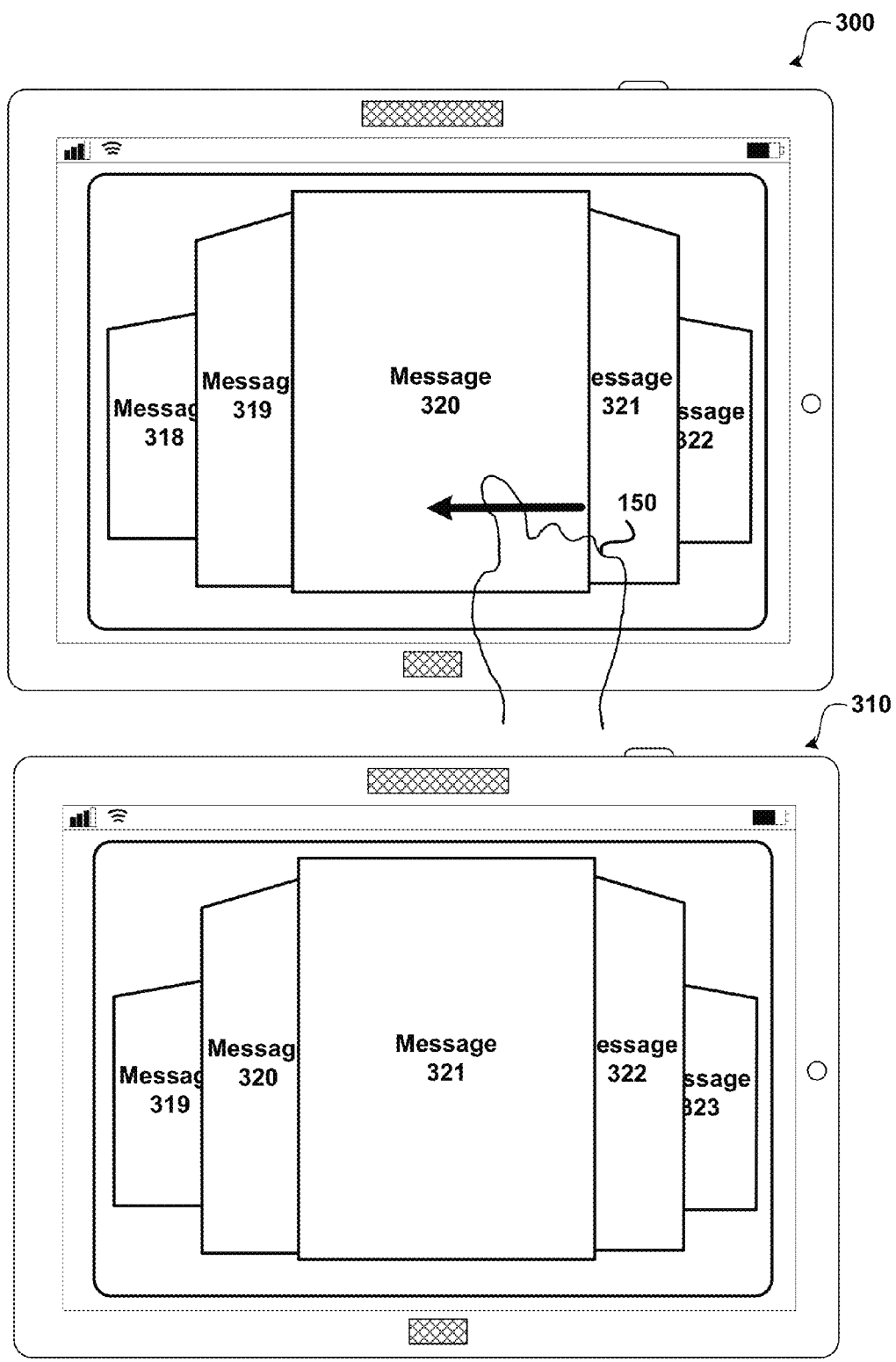
FIG. 3 illustrates a tile browsing experience.

FIG. 3 illustrates tile browsing experience. As illustrated, FIG. 3 includes display 300 and display 310.

Display 310 shows an exemplary display browsing tiles. In the current example, five tiles (318-322) may be seen on the display that represent different messages/conversations. More/less tiles may be displayed. A user may browse the tiles using different methods. For example, a user may use touch gestures, voice input and/or other input methods. As illustrated, a user has performed a swipe gesture 150 to the left that advances a display of the tiles as shown in display 310. A user may also directly select a displayed tile (e.g. tap on one of the tiles) to see a more detailed view of the tile.

Figure 4A:
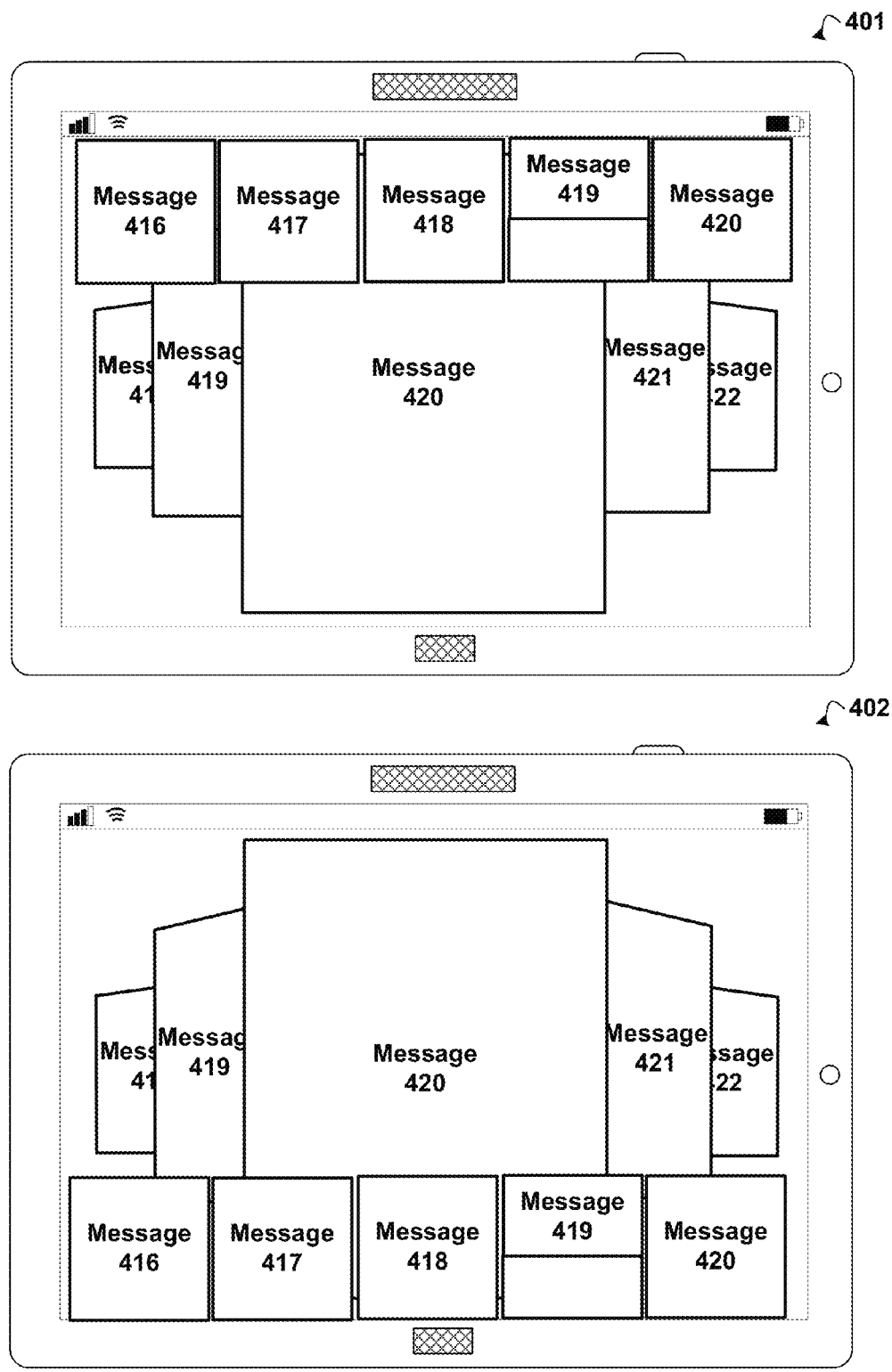
FIGS. 4A-4C illustrate a tile browsing experience including a tile strip.

FIG. 4A illustrates that while in "slide show view" (e.g as illustrated in FIG. 3), a horizontal tile strip may be shown (e.g. overlayed on top (display 401) or at the bottom (display 402), or some other location, of the screen) such that a user may select one of the overlayed messages and to jump to a different message rather than going one by one to the previous or next from the active message.

Figure 4B:
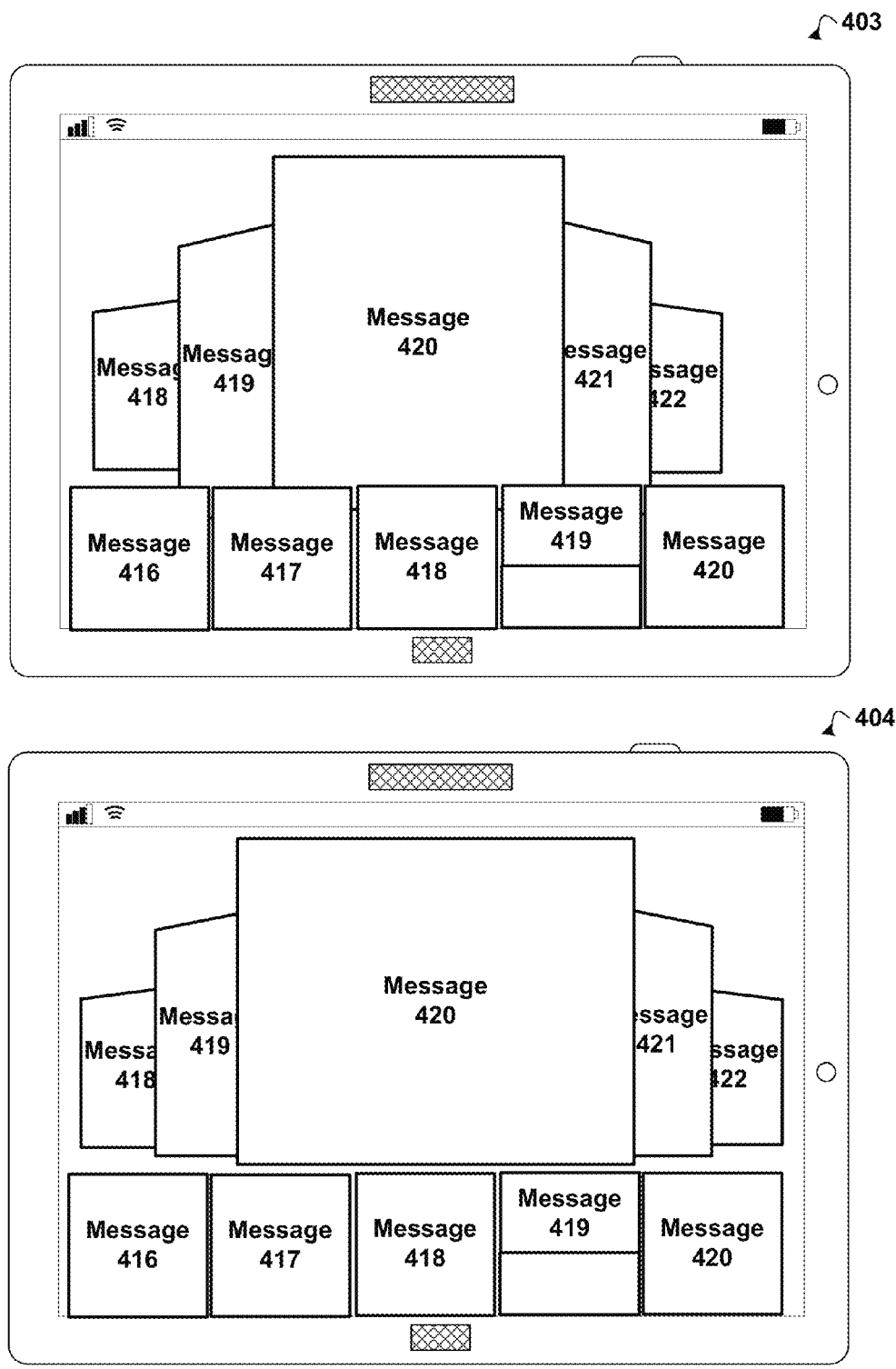

FIG. 4B illustrates that while in "slide show view" (in FIG. 3), the horizontal tile strip may be temporarily shown (e.g. dismissed upon the occurrence of an event) or be pinned to be always visible. According to an embodiment, when it is pinned, the messages are resized such that they are not covered by the tile stip.

Figure 4C:
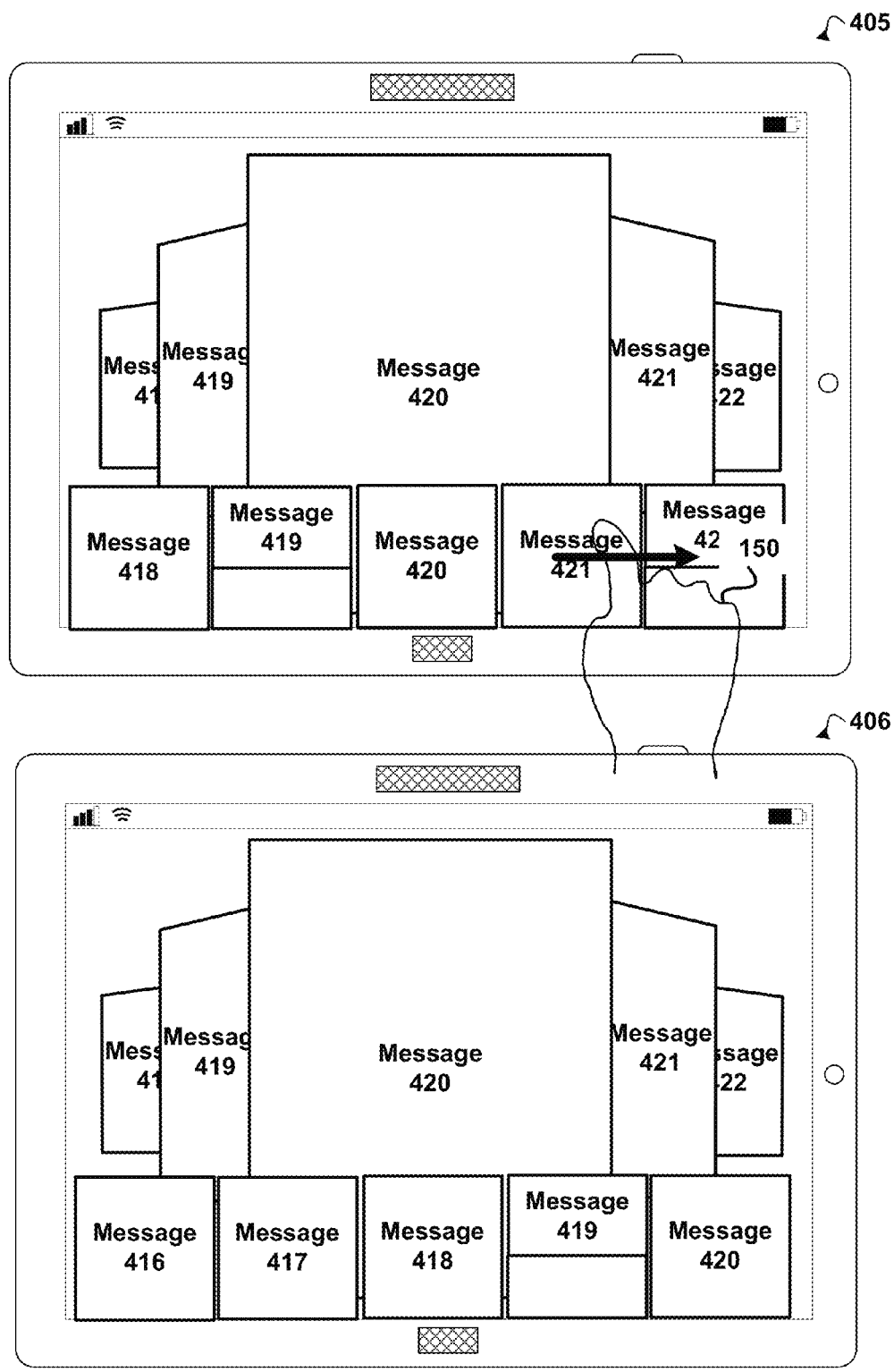

FIG. 4C illustrates a tile browsing experience including a horizontal tile strip. As illustrated, FIG. 4 includes display 405 and display 406.

Display 405 shows an exemplary display browsing tiles. In the current example, two tile strips are displayed including five tiles (418-422) that are displayed in a slide show presentation and five tiles that are shown in a second horizontal tile strip.

According to an embodiment, a user may interact with the tile strip and the slide show presentation independently. For example, a user may perform a swipe gesture 150 to move a display of the tile strip as shown in display 420 without affecting the display of the tiles displayed in a slide show presentation. According to an embodiment, when a user selects a tile, the slide show display and the tile strip are centered using the selected tile (e.g. message 420 is selected).

Figure 5:
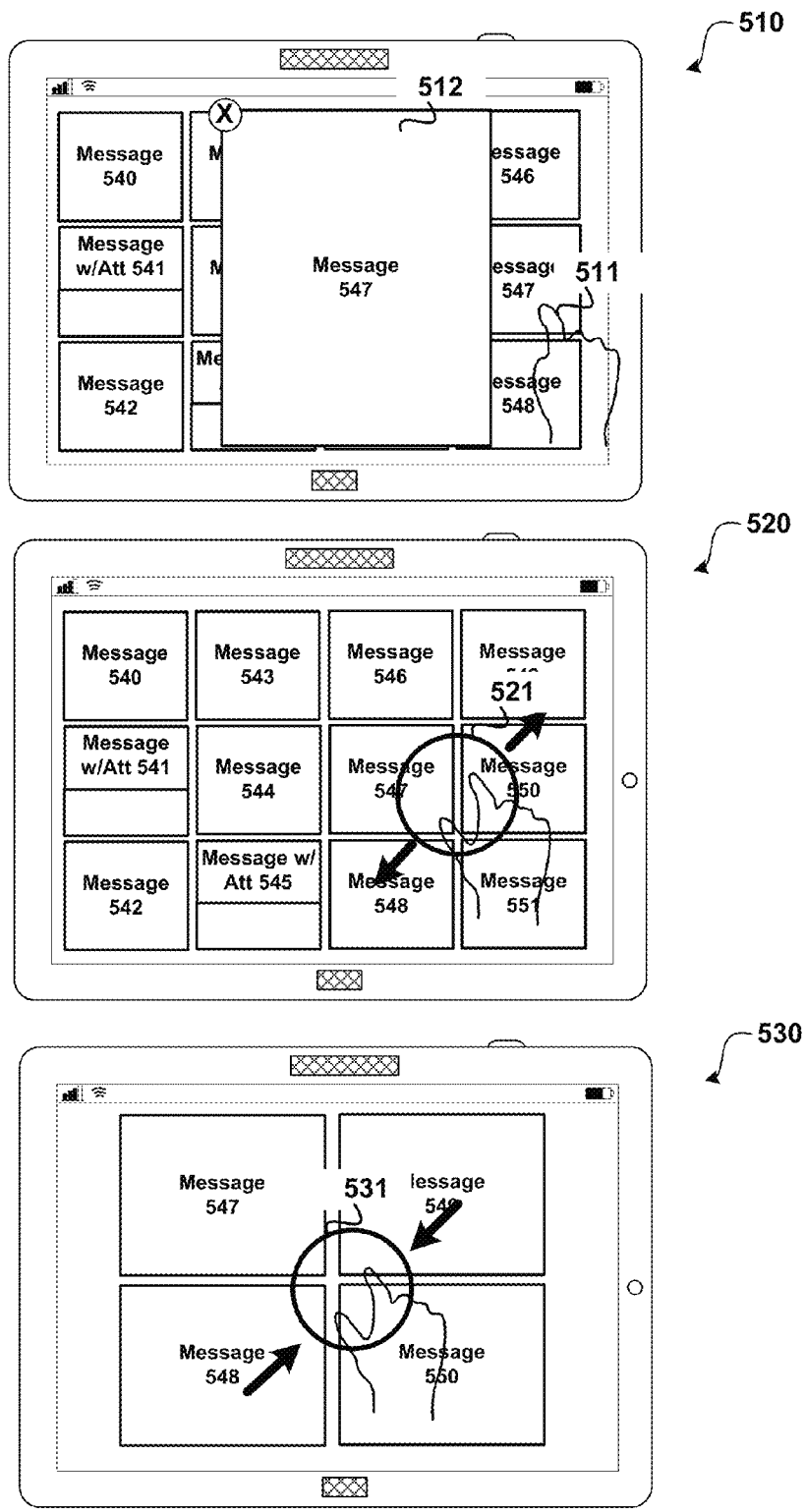
FIG. 5 illustrates using touch gestures to interact with tiles.

FIG. 5 illustrates using touch gestures to interact with tiles.

Display 510 illustrates using a tap and hold gesture on a tile. In the current example, a user has performed tap and hold gesture 511 on message 547 to temporarily display 512 message 547. The temporary display 512 may be removed upon an occurrence of an event (e.g. selecting another area of the display) and/or upon tapping on a close button on display 512.

Display 520 shows receiving a stretch gesture 521 to change a number of tiles displayed. In the current example, stretch gesture 521 is received that reduces a number of tiles displayed as indicated by display 530.

Display 530 shows receiving a pinch gesture 531 to change a number of tiles displayed. In the current example, pinch gesture 531 is received that increases a number of tiles displayed as indicated by display 520.

Figure 6:
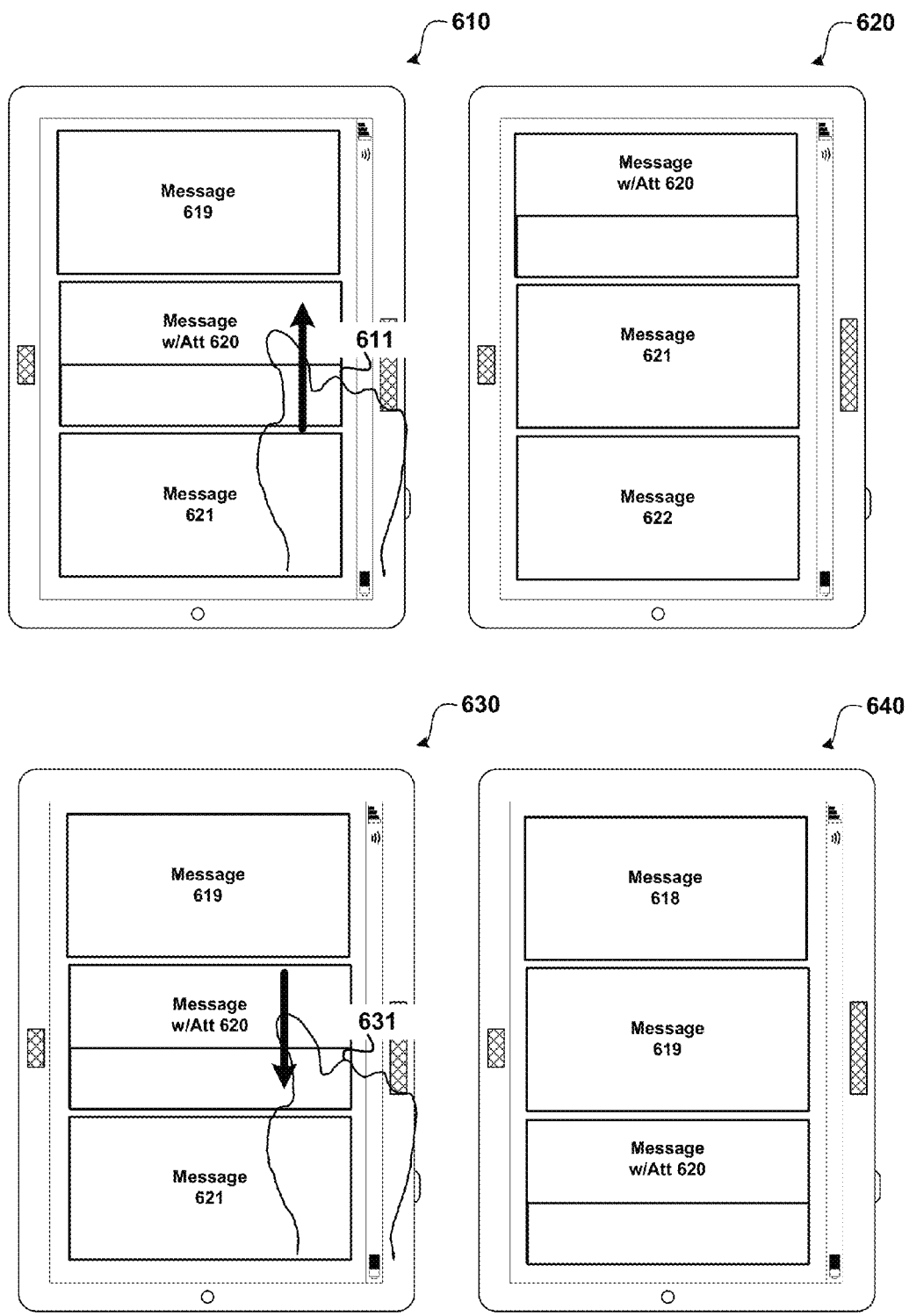
FIG. 6 illustrates using swipe touch gestures to interact with tiles.

FIG. 6 illustrates using swipe touch gestures to interact with tiles. As illustrated, FIG. 6 includes displays 610, 620, 630 and 640.

Display 610 illustrates using a swipe gesture to change the tiles displayed. In the current example, a user has performed an upward swipe gesture 611 on message 620 to change the tiles displayed as shown on display 620.

Display 630 illustrates using a swipe gesture to change the tiles displayed. In the current example, a user has performed a downward swipe gesture 631 on message 620 to change the tiles displayed as shown on display 640.

Figure 7:
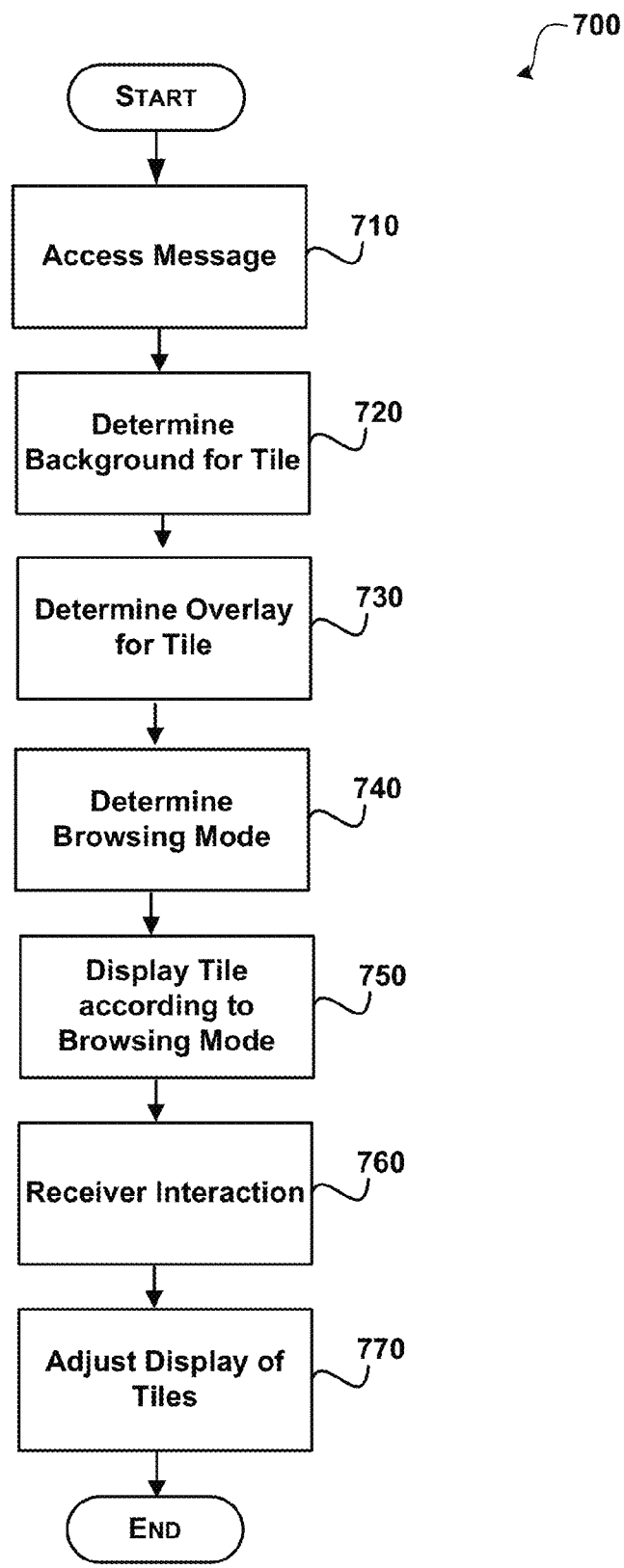
FIG. 7 shows an illustrative processes for creating, displaying and browsing tiles.

FIG. 7 shows an illustrative processes 700 for creating, displaying and browsing tiles. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 710, where an electronic message is accessed. According to an embodiment, the message is an electronic message such as an email message that is associated with a messaging application such as MICROSOFT OUTLOOK, GOOGLE MAIL, and the like. Other types of electronic messages may also be displayed as tiles (e.g. SMS, MMS, . . . ).

Flowing to operation 720, a background for the tile is determined. According to an embodiment, when a message does not include an attachment, the background of the tile includes a preview of the message along with other message information. For example, the tile includes a subject of the message, a sender(s), a time the message was sent/received along with all/portion of the content of the message. When the message includes an attachment, the background includes an image/preview of the attachments. According to an embodiment, an attachment as used herein includes attachments that are included with the delivery of the message as well as a link to the attachment and/or other content. When the tile is a conversation view, the background may include a preview of the conversation (e.g. a most recent message of the conversation) and/or other conversation information (e.g. each sender, time(s) . . . ).

Moving to operation 730, an overlay for the tile is determined. According to an embodiment, an overlay is created when the message includes an attachment. The overlay is used to display information relating to the electronic message (i.e. subject, sender, time stamp, message preview . . . ). An overlay may also be created when the message does not include an attachment. For example, an overlay may be used to display information relating to the electronic message (i.e. subject, sender, time stamp, . . . ) and the background may be used to display a preview of the message. When the tile is a conversation view, the overlay may include information not included on the background.

Transitioning to operation 740, a browsing mode is determined. For example, the browsing mode may include a conversation view, a message view, a message strip view, as well as other browsing methods (See FIGS. 1-6 for exemplary browsing modes).

Flowing to operation 750, the tiles are displayed according to the selected browsing mode.

Moving to operation 760, interaction with the tiles is received. According to an embodiment, the interaction may include touch gestures and non-touch gestures. For example, gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like. Voice input and hardware based input (e.g. pointing devices, cameras, . . . ) may be used.

Transitioning to operation 770, the display of the tiles are adjusted in response to the interaction. For example, the tiles displayed are changed, a number of the tiles displayed are changed, the browsing mode is changed, and the like.

The process then moves to an end operation and returns to processing other actions.

Figure 8:
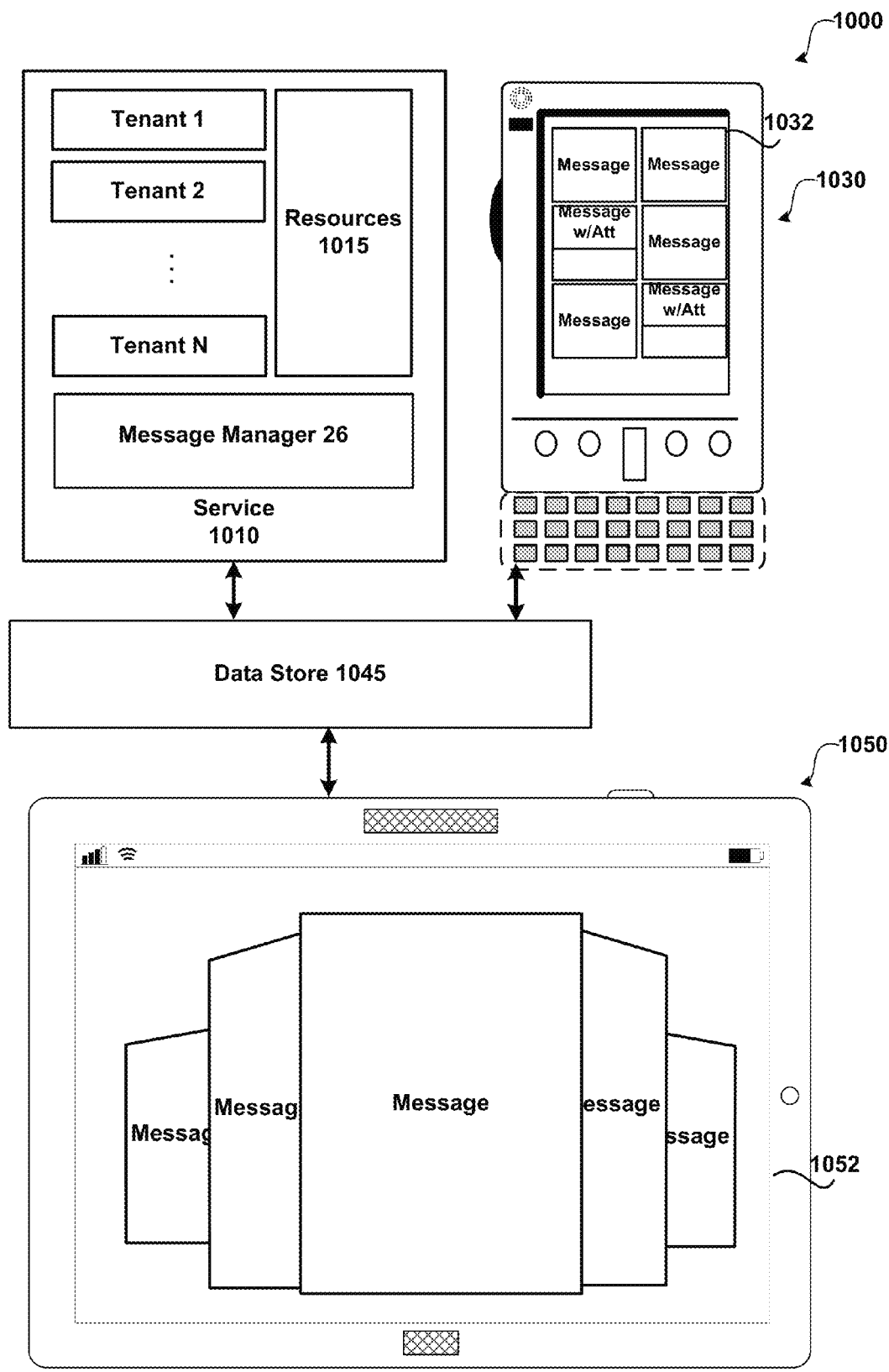
FIG. 8 illustrates an exemplary system for displaying electronic messages as tiles.

FIG. 8 illustrates an exemplary system for displaying electronic messages as tiles. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as electronic messaging services (e.g. MICROSOFT EXCHANGE/OUTLOOK), productivity services (e.g. MICROSOFT OFFICE 365 or some other cloud based/online service that is used to interact with messages and content (e.g. spreadsheets, documents, presentations, charts, messages, and the like). The service may be interacted with using different types of input/output. For example, a user may use touch input, hardware based input, speech input, and the like. The service may provide speech output that combines pre-recorded speech and synthesized speech. Functionality of one or more of the services/applications provided by service 1010 may also be configured as a client/server based application. Although system 1000 shows a service relating to a messaging application, other services/applications may be configured.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

According to an embodiment, smart phone 1030 and touch screen input device/display 1050 are configured with messaging applications.

As illustrated, touch screen input device/display 1050 and smart phone 1030 shows exemplary displays 1052/1032 showing the use of an application. Display 1052 illustrates electronic messages displayed as tiles in a three dimensional view. Data may be stored on a device (e.g. smart phone 1030, slate 1050 and/or at some other location (e.g. network data store 1045). The applications used by the devices may be client based applications, server based applications, cloud based applications and/or some combination.

Message manager 26 is configured to perform operations relating to displaying electronic messages as tiles as described herein. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
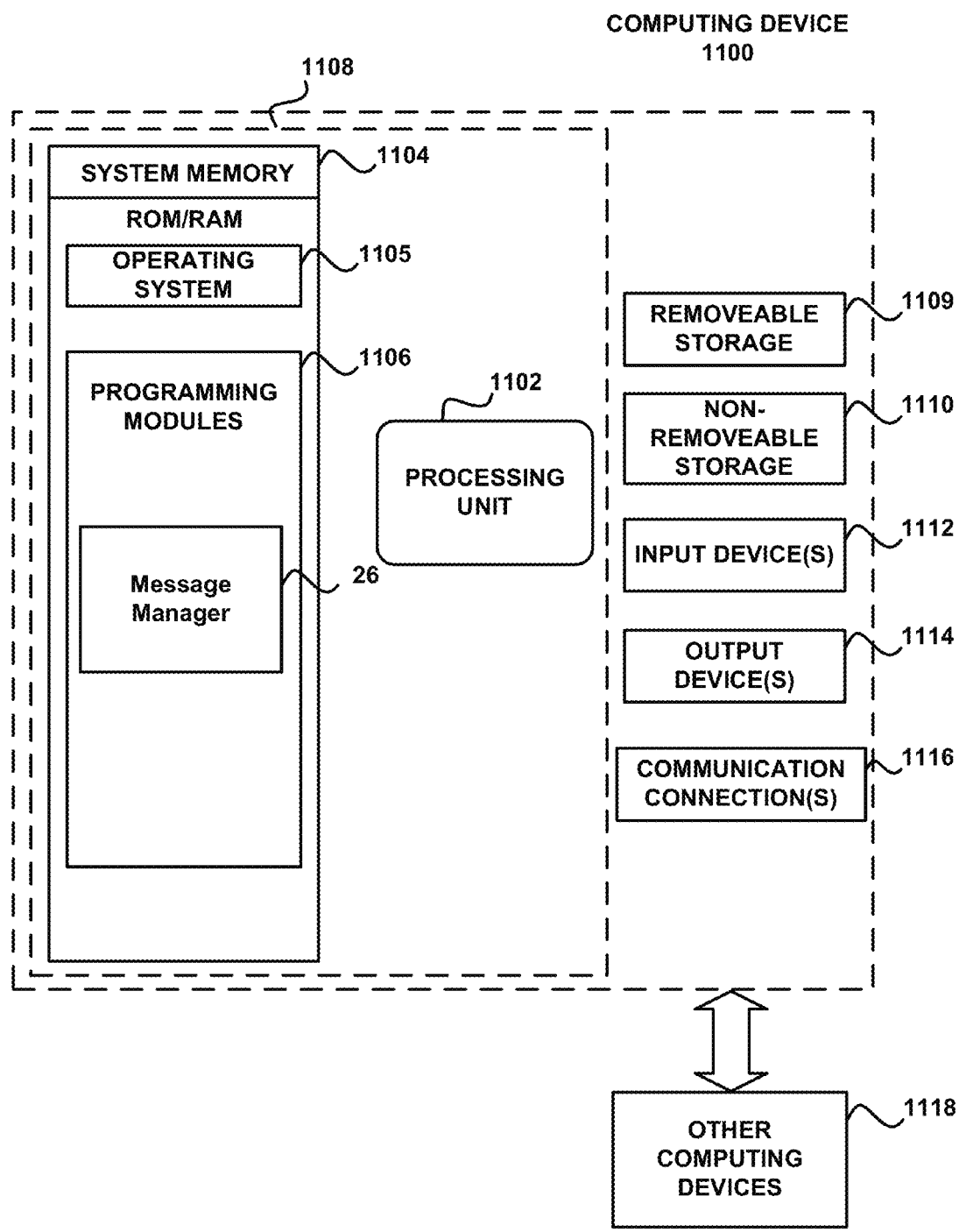
FIGS. 9-11 and the associated descriptions provide a discussion of a variety of operating environments in which embodiments of the invention may be practiced.
Figure 10A:
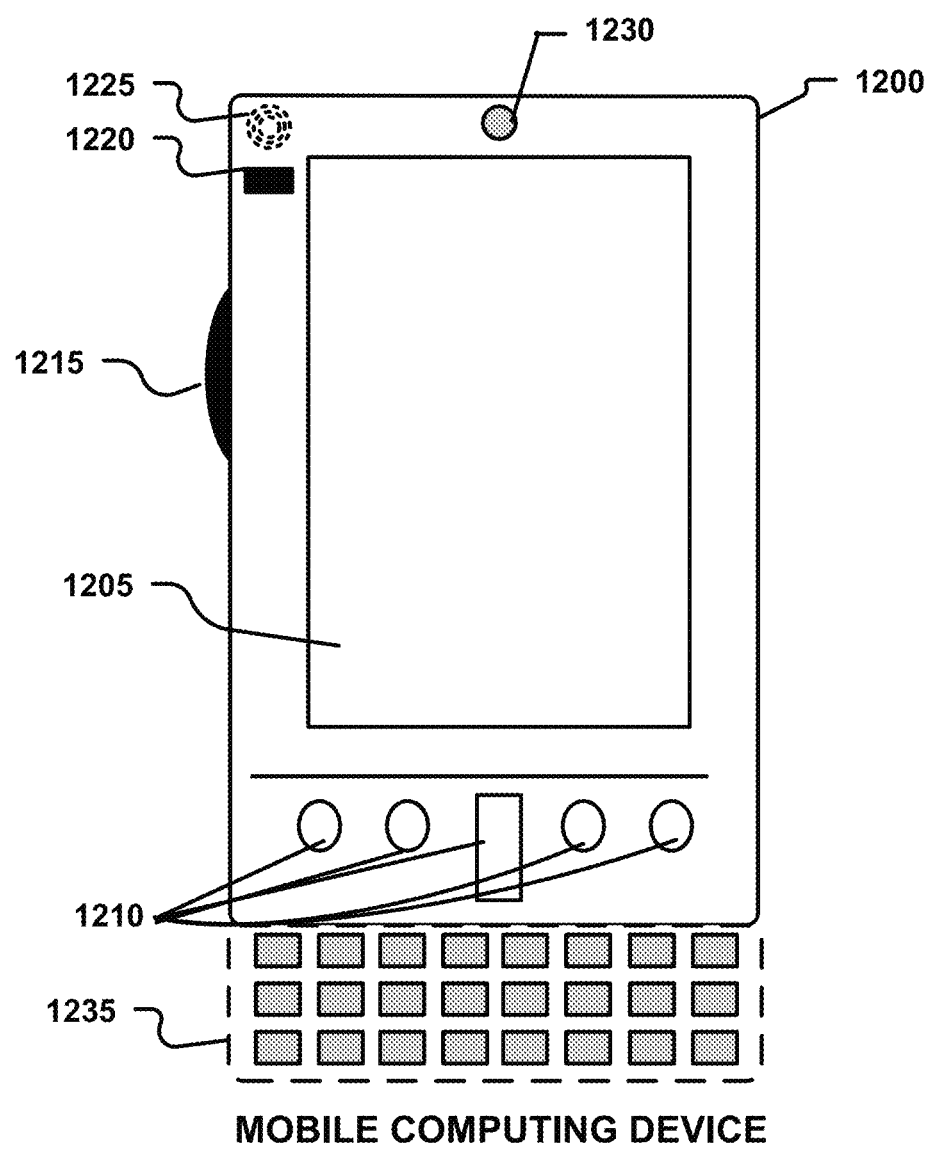
Figure 10B:
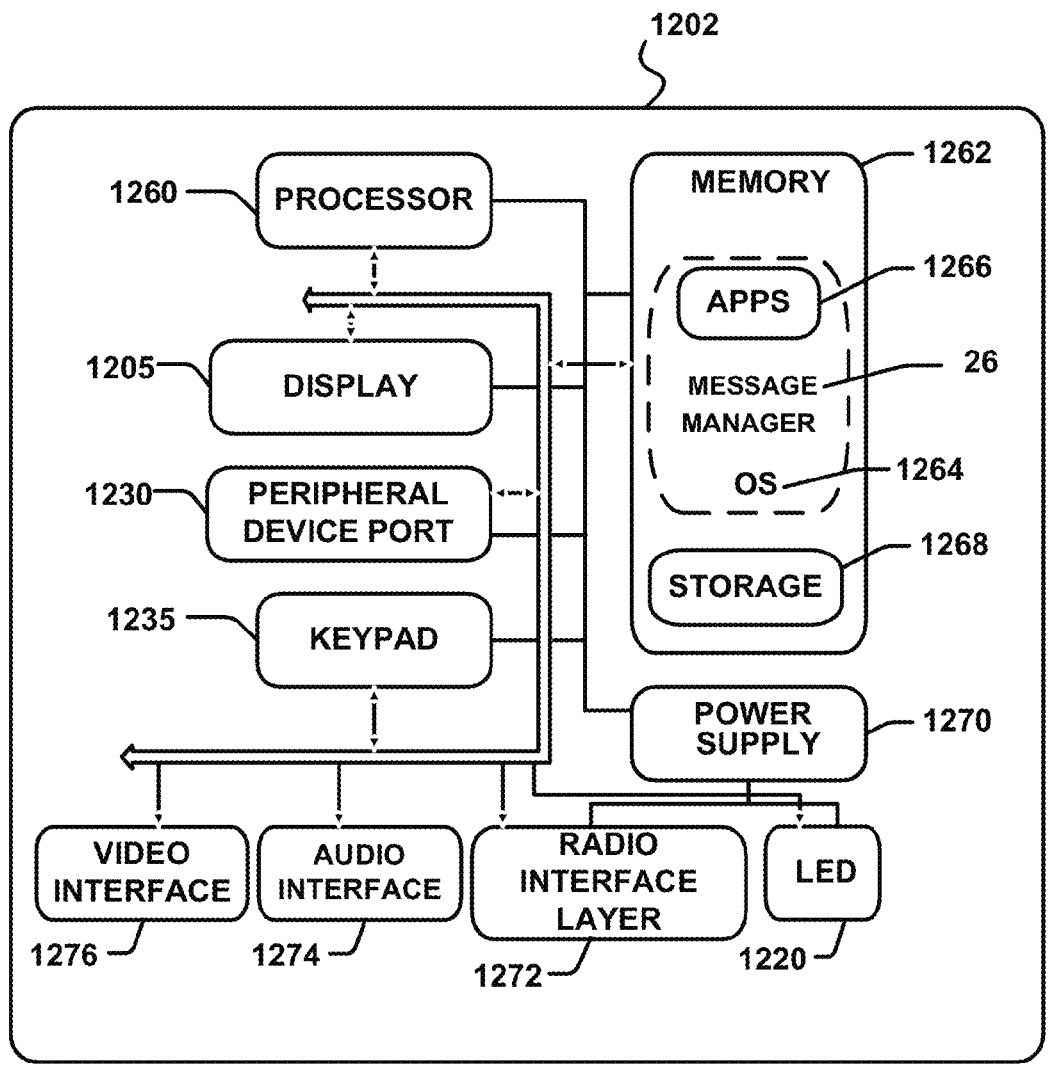
Figure 11:
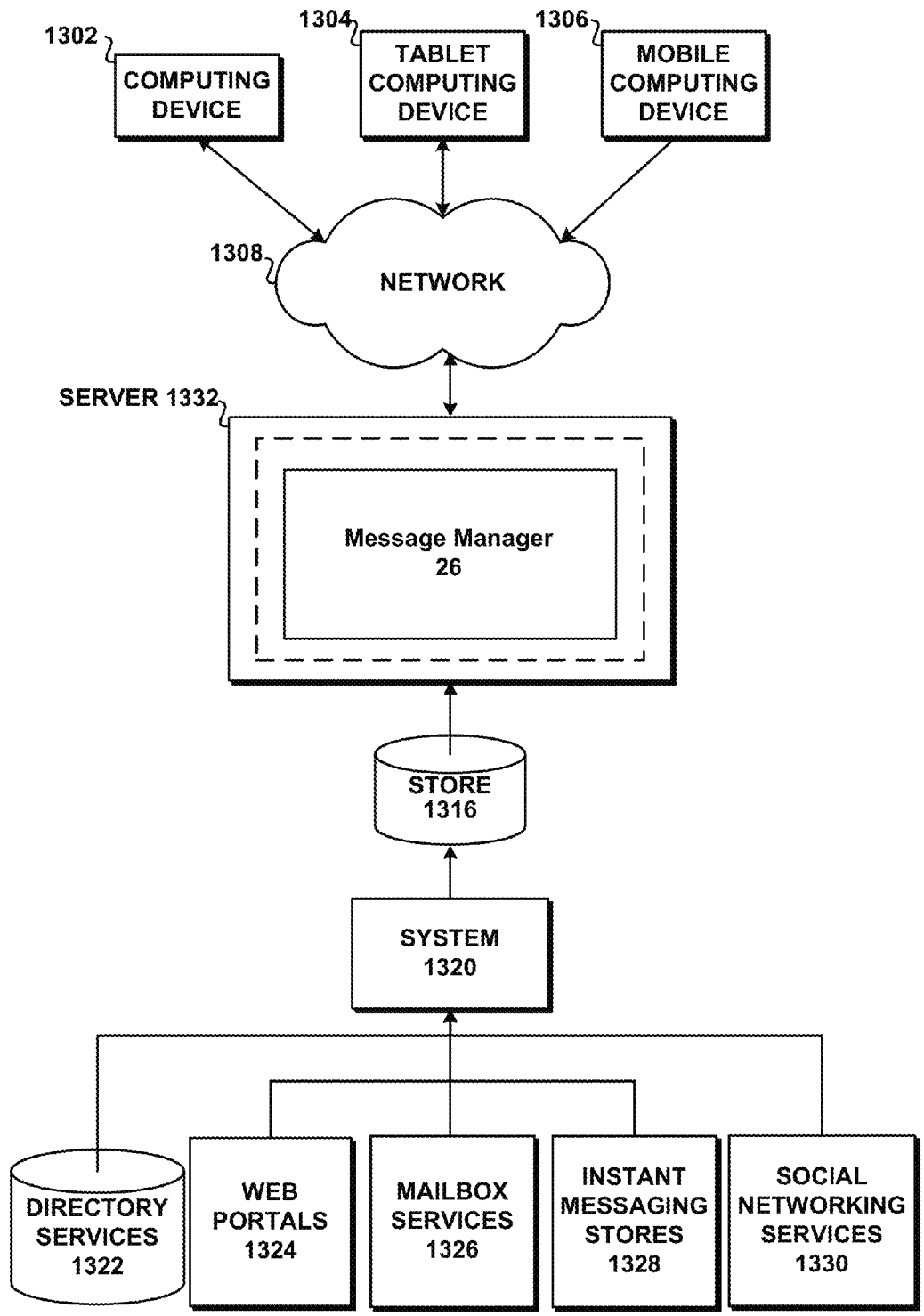

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a message manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 10A and 10B illustrate a suitable mobile computing environment, for example, a mobile telephone, a smartphone, a tablet personal computer, a laptop computer, and the like, with which embodiments of the invention may be practiced. With reference to FIG. 10A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the message manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 10B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates a system architecture for displaying and browsing electronic messages as tiles.

Components managed via the message manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to displaying messages as tiles. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for displaying electronic messages as tiles, comprising:
    accessing an electronic message;
    determining a background for a tile that includes content obtained from the electronic message, wherein the background for the tile includes a preview of the electronic message;
    creating the tile using the background;
    creating an overlay that includes information relating to the electronic message and is displayed on top of the background;
    displaying the tile on a display along with other tiles that represent other electronic messages; and
    updating the display in response to a received interaction with at least one of the tiles.

2. The method of claim 1, wherein determining the background for the tile comprises using an attachment of the electronic message to create an image for the background when the electronic message includes the attachment.

3. The method of claim 1, wherein determining the background for the tile comprises determining a number of messages in a conversation.

4. The method of claim 1, further comprising creating an overlay that includes information relating to the message and is displayed on top of the background when the electronic message includes an attachment.

5. The method of claim 1, further comprising displaying electronic messages as a mail tile strip.

6. The method of claim 5, further comprising displaying a second mail tile strip of electronic messages near a bottom of a display along with the mail tile strip.

7. The method of claim 1, further comprising displaying each of the tiles in columns and rows.

8. The method of claim 1, further comprising determining when a tile is selected and in response to the selection displaying a larger view of the selected tile.

9. The method of claim 1, further comprising receiving a touch based gesture to interact with the tiles comprising at least one of: a select gesture, a swipe gesture, a pinch gesture and a stretch gesture.

10. The method of claim 1, wherein the information relating to the electronic message that is displayed on top of the background includes one or more of a subject, a sender, and a time stamp.

11. A hardware computer-readable storage medium storing
computer-executable instructions for displaying electronic messages, comprising:
accessing an electronic message;
determining a background for a tile that includes content obtained from the electronic message, wherein the background for the tile includes a preview of the electronic message;
creating the tile using the background;
creating an overlay that includes information relating to the electronic message and is displayed on top of the background;
displaying the tile on a display along with other tiles that represent other electronic messages; and
updating the display in response to a received interaction with at least one of the tiles.

12. The hardware computer-readable storage medium of claim 11, wherein determining the background for the tile comprises using an attachment of the electronic message to create an image for the background when the electronic message includes the attachment.

13. The hardware computer-readable storage medium of claim 11, wherein determining the background for the tile comprises determining a number of messages in a conversation.

14. The hardware computer-readable storage medium of claim 11, further comprising creating an overlay that includes information relating to the message and is displayed on top of the background when the electronic message includes an attachment.

15. The hardware computer-readable storage medium of claim 11, further comprising displaying electronic messages as one of: a single mail tile strip; two mail tile strips; and displaying each of the tiles in columns and rows.

16. The hardware computer-readable storage medium of claim 11, further comprising determining when a tile is selected and in response to the selection displaying a larger view of the selected tile.

17. A system for displaying electronic messages, comprising:
a display that is configured to receive touch input;
a processor and memory;
an operating environment executing using the processor;
a display; and
a message manager that is configured to perform actions comprising:
accessing an electronic message;
determining a background for a tile that includes content obtained from the electronic message, wherein the background for the tile includes a preview of the electronic message;
creating an overlay that includes information relating to the message and is displayed on top of the background;
creating the tile using the background and the overlay when created;
displaying the tile on a display along with other tiles that represent other electronic messages; and
updating the display in response to a received interaction with at least one of the tiles.

18. The system of claim 17, wherein determining the background for the tile comprises using an attachment of the electronic message to create an image for the background when the electronic message includes the attachment.

19. The system of claim 17, wherein determining the background for the tile comprises determining a number of messages in a conversation.

20. The system of claim 17, further comprising displaying electronic messages as one of: a single mail tile strip; two mail tile strips; and displaying each of the tiles in columns and rows.

* * * * *